United States Patent [19]

Palmer

[11] 4,335,933
[45] Jun. 22, 1982

[54] FIBER OPTIC WAVELENGTH DEMULTIPLEXER

[75] Inventor: John P. Palmer, Pomona, Calif.
[73] Assignee: General Dynamics, Pomona Division, Pomona, Calif.
[21] Appl. No.: 160,395
[22] Filed: Jun. 16, 1980
[51] Int. Cl.³ .................. G02B 5/172; H04B 9/00
[52] U.S. Cl. .................. 350/96.19; 370/1
[58] Field of Search .......... 350/96.15, 96.16, 96.19, 350/162 R; 370/1, 3

[56] References Cited

U.S. PATENT DOCUMENTS

| 4,089,584 | 5/1978 | Polczynski | 350/96.16 |
| 4,111,524 | 9/1978 | Tomlinson | 350/96.19 |
| 4,136,929 | 1/1979 | Suzaki | 350/96.15 |
| 4,153,330 | 5/1979 | Tomlinson | 350/96.19 X |
| 4,301,543 | 11/1981 | Palmer | 350/96.15 X |
| 4,307,933 | 12/1981 | Palmer et al. | 350/96.16 |
| 4,317,614 | 3/1982 | Palmer | 350/96.16 |

FOREIGN PATENT DOCUMENTS

| 52-24539 | 2/1977 | Japan | 350/96.15 |
| 54-13347 | 1/1979 | Japan | 350/96.15 |
| 54-118255 | 9/1979 | Japan | 350/96.15 |

OTHER PUBLICATIONS

Hsu et al., "Single Mode Optical Fiber Pickoff Coupler", *Applied Optics*, vol. 15, No. 10, Oct. 1976, pp. 2310-2312.
Stewart et al., "Directional Couplers for Optical Fibre Commun. Systems", *Proc. of 3rd Eur. Conf. on Opt. Commun.*, Sep. 1977, pp. 170-172.
Weidel et al., "Tee-Coupler for Single-Mode Fibres", *Electron. Lett.*, vol. 15, No. 23, Nov. 1979, pp. 737-738.

*Primary Examiner*—John D. Lee
*Attorney, Agent, or Firm*—Henry M. Bissell; Edward B. Johnson

[57] ABSTRACT

An optical fiber wavelength demultiplexer including an optical fiber mounted and adhered to a curved surface having a clad single fiber core, a planar surface extending partially into and along the fiber through the cladding, a prism mounted on the surface having a reflective diffraction grating surface positioned to receive signals from the fiber travelling in one direction and demultiplex such signals, and an array of photodiodes mounted adjacent the prism to receive the demultiplexed signals.

18 Claims, 7 Drawing Figures

FIBER OPTIC WAVELENGTH DEMULTIPLEXER

BACKGROUND OF THE INVENTION

1. Field of the Invention.

This invention relates to fiber optic transmission lines and more particularly to devices for coupling to optical fibers for separating a predetermined portion of the multiplexed light signal transmitted therein and to respond discretely to the demultiplexed signals.

2. Description of the Prior Art.

The field of fiber optics has progressed in a relatively few years from laboratory curiosities and decorative pieces to present-day systems of high sophistication for optical communication and data transmission. Optical fibers or light tubes are specially fabricated filaments which exhibit the property of transmitting light longitudinally along a flexible axis. Various materials which can be used in fabrication of optical fibers and the particular properties thereof are described in Derick et al U.S. Pat. No. 3,508,589 and, in further detail, in British Pat. No. 1,037,498, cited therein. Low-loss fiber optic taps are important components for fiber optic data links and data buses. This is true because it is desirable to be able to tap a portion of a signal propagating through an optical fiber without breaking or terminating the fiber, since fiber terminations add unwanted optical losses to the system and unfavorably increase the need for highly precise fiber splicing and interconnecting arrangements. Since fiber optic transmission lines having a large number of signal taps are inherently power-starved, it is important to minimize excess losses associated with these components. Furthermore, it is desirable to have taps which can be fabricated so that the tap ratio (the power output of the tap divided by the power into the fiber in a given direction) can be conveniently tailored to the unique requirements of the given system. Efficient fiber optic taps have been reported previously whereby two fibers are cleaved, or ground and polished, at specific angles and butt joined. For example, see Karr et al, "Lightwave Fiber Tap", *Applied Optics*, Vol. 17, page 2215 (July 15, 1978) and Kuwahara et al, "A Semi-Transparent Mirror-Type Directional Coupler for Optical Fiber Applications", *IEEE Transactions on Microwave Theory and Technique*, Vol. 23, page 179 (Jan. 1975). In these examples, the tap ratio is variable either by changing the cleavage angle or by using materials with different indices of refraction between the cleaved surfaces. However, devices fabricated by such methods are quite fragile and cannot be easily reproduced with sufficient accuracy.

It has been demonstrated that when an optical fiber is bent in the form of an arc, there is an increased tendency for light to escape from the bent region in a radiation pattern which is primarily in the plane of the bend and which is directed away from the center of curvature. See, for example, Gambling et al, "Radiation From Curved Single-Mode Fibers", *Electronics Letters*, Vol. 12, page 567 (Oct. 14, 1976); and Goell et al U.S. Pat. No. 3,982,123. The tendency for light to escape from the bent region of the fibers is enhanced when a flat region is lapped and polished into the fiber surface perpendicular to the radius of the bend in the fiber.

The advantages of multiplexing such fiber optic systems are obvious. That is, with either frequency or wavelength multiplexing of a fiber optic signal, a plurality of separate and distinct signals, each carrying different data, may utilize a single optical fiber. However, in order to do this, the output of the multiplexed signal must be divided so that each channel can be separately utilized. Many different structures have been suggested for performing the multiplexing and demultiplexing steps. For instance, U.S. Pat. No. 4,001,577 of Albanese et al attaches plural separate fibers to a waveguide with a specific chirp characteristic such that the signals transmitted from the fibers to the waveguide are discriminated in accordance with the chirp and only those of a matched frequency are transmitted through the waveguide to a prism. U.S. Pat. No. 4,054,389 of Owen uses a fiber optic bundle, separates specific fibers in the bundle and attaches them to a wedge-shaped wide transmitting unit. The wedge effectively demultiplexes the signals due to variations in travel distance between the input side of the wedge and the output side containing photodiodes. A diffraction grating system has been suggested in U.S. Pat. Nos. 4,111,524 and 4,153,330 of Tomlinson, III. In these patents plural fibers are positioned at specific angles to each other at the input side of a waveguide which has an integrally formed lens. The light thus passes out of the fibers into the waveguide, through the lens, and is then selectively reflected off of the diffraction grating to demultiplex the signal.

Additionally, numerous systems requiring travel of the light through the atmosphere for interaction with a diffraction grating are suggested in the art. In U.S. Pat. No. 4,146,783 of Desbois et al plural diffraction gratings are used to separate and recombine light during a modification procedure. U.S. Pat. No. 3,863,063 of Indig et al uses a concave grating to spread the multiplexed signal out in the atmosphere and then collimates the spread signal and detects its components. Also, d'Auria et al U.S. Pat. No. 3,953,727 utilizes the spreading cone of light exiting a fiber, collimates the light with a lens and directs the collimated light to a diffraction grating. The grating then splits the light into its components and a lens is used to focus the components on separate diodes.

Since the travel of the light through the atmosphere results in relatively bulky equipment and can result in alignment problems and interference, especially during a multiplexing step, it would be appropriate to find a system which does not depend upon atmospheric travel of the light. Boyd et al suggest such a system in an article entitled "Composite Prism-Grating Coupler For Coupling Light Into High Refractive Index Thin-Film Wave Guides", *Applied Optics*, Vol. 15, No. 7, page 1681 (July 1976). The article suggests the use of a prism/waveguide interface having a diffraction grating positioned at the interface in order to phase match signals coupled into the waveguide.

SUMMARY OF THE INVENTION

The present invention is a directional wavelength demultiplexer. Wavelength division multiplexing (WDM) is commonly used to describe the superposition of several communication channels at several carrier wavelengths. It is an important technique for fiber optics transmission since it allows for multimode optical transmission through a single fiber. The purpose of the present invention is to provide for the separation of the several wavelengths carried in an optical fiber in a straightforward spatially compact, physically rugged, optically efficient, and low-cost system.

In brief, the devices of the present invention involve the use of a solid form to support and bend an optical fiber from which a predetermined amount of the incident light is to be tapped. The form is machined from a solid material, such as aluminum, and has one curved side with a radius of curvature of between 5 and 8 cm., preferably about 6 cm. A coating of epoxy resin is placed on the curved surface of the form, after which the fiber is placed in the epoxy and is constrained to the curvature of the form. When the epoxy has been cured and a plurality of forms are so prepared, the forms are mounted on a lapping and polishing fixture. The loose ends of the fibers are secured to the fixture to prevent breakage. A flat surface is lapped into the epoxy and eventually a region of the glass fiber, embedded in the epoxy, becomes exposed. Lapping of the flat surface into the fiber and the epoxy continues until the desired amount of material has been removed. The depth of removal of the fiber core is monitored by measuring the length and width of the flat region on the fiber. This measurement can be made by using a microscope with a micrometer-actuated x-y stage. The depth of the fiber removal is controlled routinely to an accuracy of $+/-10$ micrometers and preferably to an accuracy of $+/-2$ micrometers. The lapped surface is then polished using the same support fixture on a second machine which uses a fine (e.g. ¼ micron) polishing compound. Further details of such a fabrication procedure may be found in Application Ser. No. 15,027, (now abandoned) filed Feb. 26, 1979 and assigned to the assignee of this application.

The complete device comprising the invention includes a prism for directing the light travelling in a given direction in the fiber to an associated array of photodiode detectors. The prism to be assembled on the fiber element has an optical grating surface end in the direction of light travel, preferably at an angle of 52°. The performance of the demultiplexer can be dependent on the angle of the reflection from the grating face that directs the light toward the array. The prism should produce an exiting beam which sufficiently separates the wavelengths of the multiplexed signal to provide maximum channel separation. Also the fibers used in the present invention are prone to breakage during the lapping step if the radius of curvature is under 4 cm., and the curvature is related to the amount of coupling. Thus, the angle of the grating must be selected to fit all of these parameters. For a radius of curvature of 6 cm., the angle may be $52° +/-5°$. With this arrangement, nearly all of the light coupled out of the fiber is transmitted to the active area of the arrays.

The prism's optical grating reflective surface is attached to or fabricated on the reflective surface of the prism. The reflection of the optical signals from the grating causes the optical beam to be diffracted, i.e. the spectral components are separated, and different spectral regions are received separately by the photodiodes in the array. The array may be formed of discrete photodiodes or may be separate elements of a monolithic photodiode array. In addition, the photodiodes may be active elements in an array integrated with a signal processing device such as a charge-coupled shift register. Further channel separation may be provided by optical filters interposed between the exit surface of the prism and the photodetectors. However, the fundamental means for separation of the wavelength multiplexed channels is diffraction by the optical grating.

The grating, as noted, may be assembled to the prism of the coupler in a variety of ways. It may be etched or blazed into the glass of the prism or it may be a striped geometry etched in a metal film deposited on the surface of the prism. In this case, of course, the metal surface is reflective. Also, the grating may be a commercially available unit attached to the prism using optically transparent cement or epoxy. The particular channel separation desired for the unit will control the particular structure of the grating. Thus, the grating selected will depend upon the particular frequencies to be utilized as the carrying channels for the multiplexed signal.

The associated photodiode arrays are either cemented directly to the upper surface of the prism using an optically transparent epoxy or supported adjacent the prism so that the demultiplexed light leaving the prism is directed toward the appropriate photodiode. The photodiode can be packaged in a standard header/lid assembly using a lid with a window in it. More specifically, the photodiodes can be packaged in a hybrid microelectronic assembly whereby a preamplifier is included in the assembly and a window is provided on the packaged lid.

The fiber/prism/grating/photodiode system is preferably mounted rigidly in a suitable package, such as an aluminum box or molded enclosure, which supports a pair of opposed optical connectors and an electrical connector needed to interface with the device. In such an embodiment, the radiating light which is tapped from the fiber is highly localized by virtue of the coupling from the flat region of the bent fiber to the photodiodes using the described optical prism and grating.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figures 1, 2:
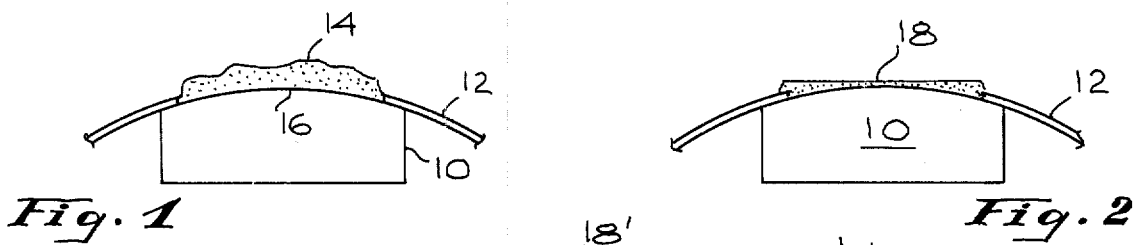
FIG. 1 is a view of a portion of one embodiment of the invention in a preliminary stage of fabrication.
FIG. 2 is a view of the portion of FIG. 1 following a succeeding step in the fabrication process.

FIG. 1 illustrates a form 10 to which an optical fiber 12 is affixed by cured and hardened epoxy resin 14. The form 10 is machined of solid material, such as aluminum, to develop a curved side 16 with a circular arc having a radius of curvature between 5 and 8 cm., preferably of 6 cm. Sufficient epoxy is applied to result in an adequate support surface when the part is lapped, as shown in FIG. 2. After epoxy 14 has been cured, form 10 to which fiber 12 is attached, together with a plurality of other forms and fibers which have been similarly prepared, is mounted on a lapping and polishing fixture (not shown). In this step, the exposed loose ends of fibers 12 are secured to the fixture to prevent breakage. A flat surface 18 is lapped into the epoxy, as shown in FIG. 2. During lapping in this fashion, a small section of fiber 12 becomes exposed and lapping of the flat surface 18 continues into fiber 12 and epoxy 14 until a predetermined amount of fiber has been removed. The depth of penetration of the fiber core is monitored by measuring the length and width of surface 18 along fiber 12. This measurement is made using a microscope and the depth of fiber removal is controlled routinely to an accuracy of +/−10 micrometers, preferably within +/−2 micrometers. If the radius of curvature of the fiber is less than about 4 cm., fiber 12 tends to crack as soon as the lap cuts through the buffer coating or cladding (not shown) which surrounds the fiber. Therefore, the preferred radius of curvature for fiber 12, which is determined by curved surface 16 on form 10, is 6 cm. After lapping, the flat surface is polished using the ¼ micron particle size polishing compound. If the fiber is to be a throughput fiber, as shown, and only a portion of the signal tapped and demultiplexed only a portion of fiber 12 is lapped away. However, should it be desired to make a demultiplexer where further communication of the signal is not desired, the fiber would be severed completely so that all of the light in the fiber would be coupled into the prism.

Figure 3:
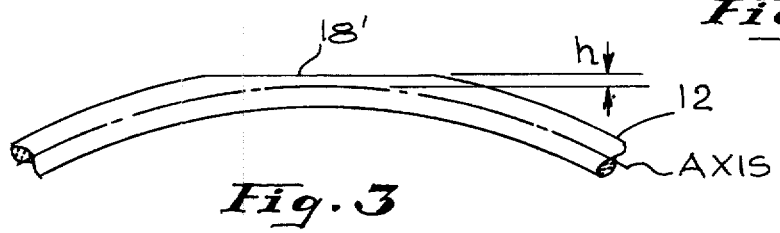
FIG. 3 is a schematic view of the fiber after treatment as in FIG. 2.

As indicated in FIG. 3, which is a schematic representation of a portion of fiber 12 lapped to provide planar surface 18′, dimension h is the distance from the fiber axis to flat surface 18′. This dimension affects the performance parameters of the optical fiber demultiplexer.

Diffraction grating faced optical prism 20 of FIG. 4 is mounted on the flat surface of the fiber to couple and diffract a fraction of the light travelling from left to right in the fiber away from the fiber to a photodiode array. The percentage of the light coupled from the fiber to the photodiode array is controlled by the depth of the flat surface 18′ (FIG. 3) lapped into the fiber. Only light propagating in one direction is coupled into the array; thus only one prismatic surface, and one photodiode array are provided for in the present invention. Prism 20 is provided with mating surface 22 which eventually contacts flat surface 18′ of FIG. 3. Light enters the prism through surface 22 travelling toward optical grating surface 24 on the prism's side. The surface is at an angle φ of 52° +/− 5° from the surface 22 as shown. This angle, of course, varies with the radius of curvature previously described, but for the preferred radius of curvature of 6 cm., 52° is the appropriate angle. The light is reflected inside the prism from surfaces 24 and outward to the photodiode array, not shown. In its preferred from the prism used in the present invention has a length (x) of 0.50 inches, a height (y) of 0.16 inches and a thickness (z) of 0.05 inches.

Figures 4A, 4B:
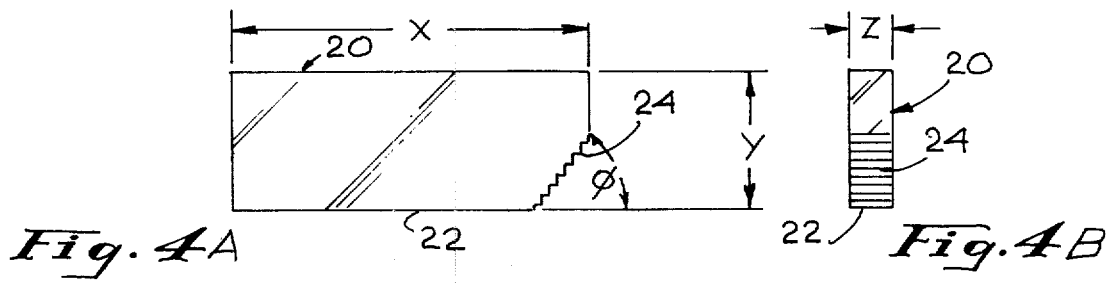
FIGS. 4A and 4B are schematic views of the second portion of one embodiment of the present invention.

The prism to be attached to the fiber is illustrated in FIGS. 4A and 4B. The index of refraction of the glass used in the prism is important to consider. It has been determined that for best results the index of refraction of the prism, which is preferably glass, should be greater than but nearly equal to, the index of the fiber core. For example, when using a fiber with a core index of 1.61, such as the Galite 3000 LC fiber manufactured by Galileo Electro-Optics, Inc., prism glass with an index of 1.62, such as F-2 glass manufactured by Schott Glass Company, is most appropriate. The surface is metallized, for example, by vacuum deposition of gold or aluminum and then selectively etched to remove portions of the film. Thus they act as diffraction gratings. The light beam from the fiber strikes the reflective surface and is then reflected toward the top surface. The angles of the reflecting surfaces and the widths between the grating reflective surfaces are chosen so that the reflected light beams are diffracted and separate into discrete wavelength bands. This helps reduce reflection loses at the prism/photodiode array interface.

The preferred angles, as noted with regard to the specific arrangements disclosed herein, are both 52°.

Figure 5:
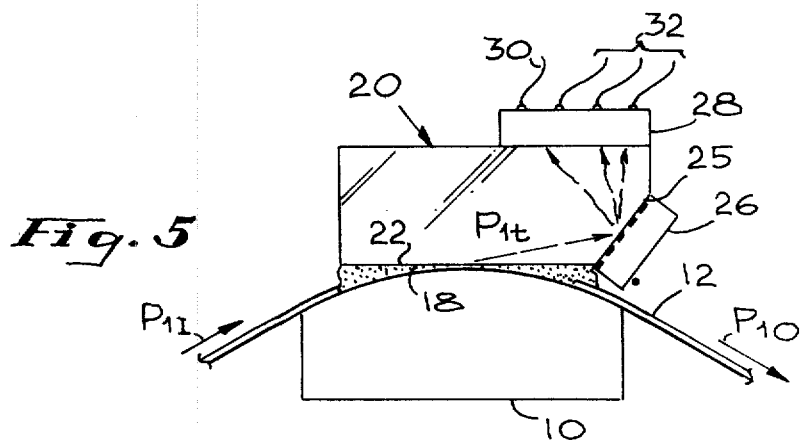
FIG. 5 is a schematic of an assembled unit.

Diffraction grating 26 is adhered to surface 25 in FIG. 5 prior to mounting prism 20. In this form, the diffraction grating is adhered by, for instance, optically clear adhesive such as epoxy to reflective surface 24. However, as noted above, the diffraction grating can be produced by vacuum deposition of metal on surface 25 followed by selective etching. Also, photodiode array 28 is adhered to the upper surface of prism 20 by the same type of optically transparent adhesive. The array is provided with a common electrical line 30 and plural individual channel output electrical lines 32. Thus, in the figure, multiplexed light may be demultiplexed into three separate signals or channels.

In FIG. 5, form 10 is shown with fiber 12 mounted and lapped in place to form contact surface 18. Prism 20, provided with surface 25, diffraction grating 26, photodiode array 28 and contact surface 22, is positioned over the flat lapped surface. It is then cemented in place, using clear optical epoxy, for example. At this point in the process of producing the present structure, the photodiode array if not already positioned may be cemented to the prism over the region from which the diffracted beam exits the prism. The beam is shown as the arrows and indicated at $P_{1I}$. A portion of a light signal input $P_{1I}$ is tapped off as signal $P_{1I}$ with the remainder continuing on through as $P_{1O}$. A multiplexed light signal can be input to the fiber, the photodiode array placed on the prism, and the electrical response of the array monitored. When the wavelength separation and the overall output photocurrent of the array are maximized, by moving the array, it has been properly positioned and is cemented in place. Only one photodiode array is required in the directional demultiplexer of the present invention.

Figure 6:
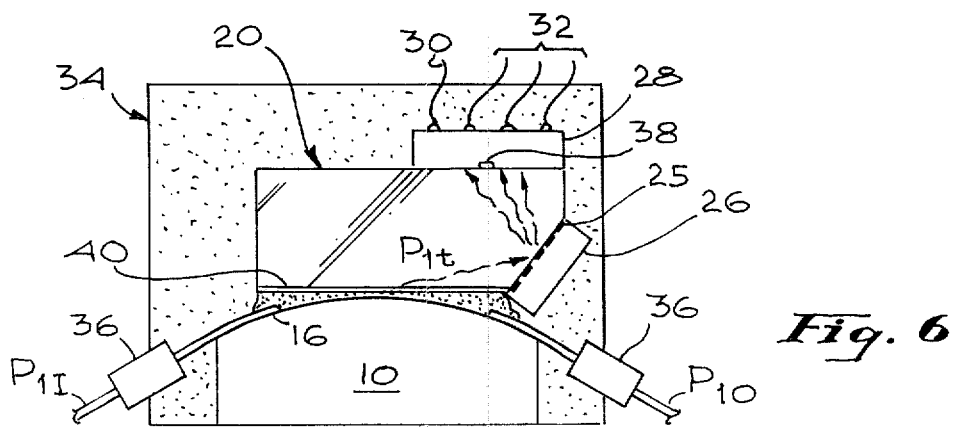
FIG. 6 is a schematic of the completed unit.

Finally, at this point, the demultiplexer, as shown in FIG. 6, is encapsulated in a potting compound 34 and provided with optical connectors 36. An exemplary potting compound is Ablecast No. 402. The resulting unit may be connected by connectors 36, in line, for tapping off portions of the multiplexed signal from a throughput fiber. Also, an optional filter 40 has been inserted between the prism and the fiber to remove unwanted signals from the coupled multiplexed signal or to select particular signals for directing to the photodiode array.

In selecting the type of grating, the size of the prism, the photosensitive diode array, etc., the following factors are of importance. Generally, either the particular wavelengths to be utilized, or the photosensitive diodes are selected first. These, of course, must be matched in order for the unit to properly function. Next, the unit size is determined, especially if it is important to miniaturize the unit. It should be noted that the further the diodes are away from the diffraction grating the better the separation of the various wavelengths of demultiplexed signals. However, there is an inherent power loss with travel through a thick prism. Thus, since photosensitive diodes are commercially available which are very sensitive to low power light signals, the geometry of the system is more controlled by the need to separate the wavelength channels and the height y of the prism is generally controlled by the spacing between the photodiodes, the type of grating and the spacing in the grating. Also, the angle of impingement of the multiplexed light upon the diffraction grating affects the rate of separation of the various wavelengths, as does the grating pitch. Thus, the particular wavelengths of light available, the effective wavelength sensitivities of the photosensitive elements, and the geometry of the system control the specific design of the unit.

The use of an angle of 52° for the diffraction grating generally presumes that the grating fully separates the multiplexed signals into the various wavelengths contained therein. Where less efficient gratings are utilized often a centrally positioned signal containing a portion of the signal of each wavelength is present. When this occurs it is desirable to minimize the effect of this signal by placing a light absorptive element, such as the block 38 shown in FIG. 6, at the point where the central multiple wavelength signal exits the prism. Alternatively, the angle of the grating can be changed from the preferred 52° angle to an angle that directs this central signal away from the photodiode array and still directs the demultiplexed signal toward the array in a higher order diffraction pattern.

For example, if it is desired to isolate five different channels of wavelength multiplexed optical data produced by injection laser diodes having center wavelengths to 805, 825, 850, 870 and 885 nm. the first-order diffraction from the grating would be determined by the equation:

$$\lambda = 2d \sin\theta$$

where $\lambda$ is the optical wavelength, d is the pitch of the grating and $\theta$ is the angle of the diffracted rays relative to the grating normal. In order to minimize cross-talk it would be necessary to maximize the derivative of the diffraction angle with respect to the optical wavelength. Thus, differentiating the above equation, the change in angle relative to the change in wavelength is:

$$d\theta/d\lambda = (\tan\theta)/\lambda = 1.2 \tan\theta$$

in radians per $\mu$m. Since the tangent $\theta$ increases rapidly with increasing $\theta$ so long as $\theta$ is greater than 45°, the wavelength discrimination will improve substantially for increased values of $\theta$. However, the efficiency of the demultiplexer would depend on the diffraction angle and on polarization of the incident light. This efficiency is affected by the diffraction angle, blaze angle, and optical polarization; and it diminishes to zero as the diffraction angle approaches 90°. Substituting in the above equations, it will become apparent that the pitch of the grating should be slightly more than one-half the value of the longest wavelength to be diffracted. Thus, if an angle of 52° is chosen for use with the five injection laser diodes mentioned above, a grating having 1850 lines per mm would be desired. This is within the range of commercially available diffraction gratings. It should be noted that, due to the close spacing of the diffraction angles (for example, the above unit results in diffraction angles varying from 48.1° to 54.9°), the optical signal incident on the grating should be well collimated. Thus the system must be designed well in order to prevent unacceptable power losses from occurring.

Although there have been described above specific arrangements of a directional demultiplexer for fiber optics in accordance with the invention for the purpose of illustrating the manner in which the invention may be used to advantage, it will be appreciated that the invention is not limited thereto. For example, although the invention has been disclosed in the context of association with directional demultiplexers using visible light, the principles of the invention are equally applicable to systems not using visible light and the like. Accordingly, any and all modifications, variations or equivalent arrangements which may occur to those skilled in the art should be considered to be within the scope of the invention as defined in the appended claims.

What is claimed is:

1. A fiber optic directional demultiplexer for tapping off predetermined portions of wavelength optical energy from a single optical fiber and demultiplexing the optical energy comprising:

a curved form for supporting an optical fiber and shaping a portion thereof to a predetermined segment of a circle;

a single optical fiber mounted on said form;

means for affixing the optical fiber along a portion thereof to the curved portion of the form of a selected radius of curvature, the fiber and affixing means in the center section of the curved portion of the fiber being lapped and polished to a preselected depth of penetration into the fiber to develop a planar surface;

prism means having a face of a predetermined characteristic angle affixed to said planar surface in contact with the optical fiber and affixed thereto by means of an optically transparent adhesive;

light diffracting means formed on said prism face in line with the path of multiplexed light coupled from the fiber to the prism and effective to reflect and diffract selected portions of said light; and photosensitive means having plural photosensitive elements positioned adjacent said prism to respond selectively to different wavelengths of light directed from the light diffracting means.

2. The device of claim 1 wherein the photosensitive means is cemented to the prism by means of an optically transparent adhesive.

3. The device of claim 1 wherein the photosensitive means is separate from the prism and mounted adjacent thereto so that light passing through the prism and reflected by the diffracting means is directed to the photosensitive means.

4. The device of claim 1 further comprising a pair of optical connectors coupled to opposite ends of the fiber, circuit means incorporated in the photosensitive means, and an enclosure supporting the form, the photosensitive means and the circuit means in operative relationship.

5. The device of claim 4 wherein the circuit means further comprises a preamplifier stage integrated with said photosensitive elements in a single unit.

6. The device of claim 1 wherein the radius of curvature of the curved portion of the form and a portion of the optical fiber affixed thereto is selected to be between 5 and 8 cm.

7. The device of claim 6 wherein the selected radius of curvature is 6 cm.

8. The device of claim 1 wherein the material of the form is aluminum.

9. The device of claim 1 wherein the characteristic angle of the prism face is selected to be 52°+/−5°.

10. The device of claim 9 wherein the characteristic angle is 52°.

11. The device of claim 1 wherein an optical filter is positioned between the planar surface of the fiber and the prism.

12. The device of claim 1 wherein said light diffracting means comprises an optical grating.

13. The device of claim 12 wherein said grating comprises a metallic surface deposited on said prism face and selectively etched to form said grating.

14. The device of claim 12 wherein said grating is blazed into said prism face.

15. The device of claim 12 wherein the pitch of said grating is selected to be over one-half of the wavelength of the light to be diffracted.

16. The device of claim 12 wherein the grating is cemented to the prism face using an optically transparent adhesive.

17. The device of claim 1 wherein the characteristic angle of the prism face is selected to diffract higher order diffracted signals to the photosensitive means.

18. The device of claim 1 wherein the photosensitive means includes means to absorb signals that are not diffracted.

* * * * *